United States Patent [19]

Okamoto et al.

[11] Patent Number: 4,874,522
[45] Date of Patent: Oct. 17, 1989

[54] POLYSULFONE HOLLOW FIBER MEMBRANE AND PROCESS FOR MAKING THE SAME

[75] Inventors: Takehiko Okamoto; Akio Ohmory; Akinori Sueoka; Ichiro Kawata; Hiroyuki Akasu, all of Kurashiki, Japan

[73] Assignee: Kuraray Co., Ltd., Kurashiki, Japan

[21] Appl. No.: 205,079

[22] Filed: Jun. 10, 1988

[30] Foreign Application Priority Data

Jun. 12, 1987 [JP] Japan .................... 62-147306

[51] Int. Cl.$^4$ ........................... B01D 13/00
[52] U.S. Cl. .................. 210/645; 210/634; 210/321.6; 210/500.41; 264/41
[58] Field of Search .......... 264/41, 177.14, 200, 264/209.1, 561; 210/500.41, 634, 644, 645–647, 649, 650, 651–654, 321.6, 321.71

[56] References Cited

U.S. PATENT DOCUMENTS 4,342,711 8/1982 Joh et al. .................... 264/41

FOREIGN PATENT DOCUMENTS 05291 11/1979 Japan .
008277 8/1981 Japan .
017801 9/1981 Japan .
055784 11/1981 Japan .
156296 5/1982 Japan .
212567 7/1983 Japan .

OTHER PUBLICATIONS

Pat. No. 130,566, 9/81 Brunswick Corporation.

Primary Examiner—Frank Sever
Attorney, Agent, or Firm—Kramer, Brufsky & Cifelli

[57] ABSTRACT

The polysulfone hollow fiber membrane provided by the present invention can prohibit bacteria, bacilli, viruses and the like, and is therefore useful, besides as an industrial filter for water purification, as a membrane for body fluid filtration or condensation. In particular, the polysulfone hollow fiber membrane is, being excellent in removing $\beta_2$-MG, markedly useful as a membrane for treating body fluid such as hemodialysis and hemofiltration.

20 Claims, 4 Drawing Sheets

POLYSULFONE HOLLOW FIBER MEMBRANE AND PROCESS FOR MAKING THE SAME

BACKGROUND OF THE INVENTION

1. Field of the Invention

This invention relates to a polysulfone hollow fiber membrane and the process for making the same; more particularly, to a polysulfone hollow fiber membrane comprising an inner surface of skin layer, a microporous structure inside said membrane, and an outer surface having micropores of an average pore diameter of 500 to 5,000 Å at a fractional surface porosity of 5 to 50%, and the process for making the same.

2. Description of the Prior Art

Recently techniques utilizing membranes having selective permeabilities in the medical field have been markedly developing, and they are being placed one after another in practical use for various filtration media and artificial organs. Particularly, membranes having a form of hollow fiber are advantageous in acquiring large membrane area per volume, and examples of their practical application therefore have been increasing. For materials of the selectively permeable membrane for medical uses, many kinds of polymers have been developed, and there are now in use polymers such as cellulose, cellulose acetate, polyamides, polyacrylonitriles, polymethyl methacrylates, polyvinyl alcohols, polysulfones, polyolefins and the like.

Since polysulfones are excellent in physical and chemical properties such as heat resistance, resistance to acid, resistance to alkali and resistance to oxidation, they have attracted attention in the field of industrial uses and been studied for application to ultrafiltration, reverse osmosis, supporting member for the composite membrane for separating gases, and the like. For example, Unexamined Japanese Patent Laid-Open No. 145379/1979 discloses a "slope-type" polysulfone hollow fiber of both-side skin type having on the inner surface and the outer surface thereof micropores with pore diameters of from 10 to 100 Å, which pore diameter gradually increases inward the membrane.

Unexamined Japanese Patent Laid-Open Nos. 105704/1981 and 115602/1981 disclose a polysulfone hollow fiber comprising no microscopically observable pores or open area on both sides of the membrane and an inside structure of bundled-type type, so-called finger-like structure.

Unexamined Japanese Patent Laid-Open No. 114702/1983 discloses a membrane of a sponge-like structure, comprising microslits having an average width of not more than 500 Å on its inner surface and micropores having an average pore diameter of 1,000 to 5,000 Å on its outer surface.

Unexamined Japanese Patent Laid-Open 152704/1981 discloses a polysulfone hollow fiber membrane comprising a skin layer(s) on its inner surface and/or outer surface, and a sponge layer adjacent to the skin layer; Unexamined Japanese Patent Laid-Open No. 82515/1982 discloses a polysulfone hollow fiber membrane comprising a skin layer on its inner surface and cavities adjacent to the skin layer; and Unexamined Japanese Patent Laid-Open No. 154051/1981 discloses an asymmetric polymer membrane comprising a skin and a porous support.

Further known as a hollow fiber membrane for medical use is hemofilter, "DIAFILTER", of Amicon Corporation and "HEMOFLOW" of Fresenius AG.

All of the above-mentioned membranes, however, have drawbacks as described below.

The membrane disclosed in Japanese Patent Laid-Open No. 145379/1979 has a low filtration rate for filtering body fluid on account perhaps of the skin layers being on both sides or of low continuity of pores inside the structure. The membrane disclosed in Japanese Patent Laid-Open Nos. 105704/1981 and 115602/1981 is also unsatisfactory in view of filtration rate for body fluid. The membrane disclosed in Japanese Patent Laid-Open No. 114702/1983 is, though sufficient in filtration rate for body liquid, has too large a permeability for serum albumin, resulting in a flow-away of serum albumin.

The membrane having skin layers on both sides thereof described in 152704/1981 is, though having a low permeability for albumin, which is preferred, low in permeability for inulin and thus inferior in an effect of removing substances having medium molecular weights.

The membrane described in Japanese Patent Laid-Open No. 82515/1981 and the asymmetric membrane described in Japanese Patent Laid-Open No. 154051/1981 have a drawback of low resistance to pressure.

Further, the hemofilter membrane (DIAFILTER) has a low pressure resistance, while it has a dense skin layer on the inner surface thereof, a number of macropores having pore diameters of not less than $10\mu$ on the outer surface thereof, and a finger-like structure throughout the inside thereof, thereby rendering the water permeability considerably high.

HEMOFLOW of Fresenius AG is a sponge-like structure membrane having micropores of about 6,000 Å diameter on its outer surface and micropores of about 500 Å diameter on its inner surface; and has a drawback of time-dependent decrease of filtration performance against blood due to the micropores on the inner surface, which causes clogging of proteins in the blood.

There is also known "SULFLUX" of Kanegafuchi Chemical Ind. Co., a sponge-structure membrane having micropores of 1,000 to 3,000 Å diameter on its inner and outer surfaces, which however has permeabilities for proteins such as albumin of at least 90% and is different from the membrane of the present invention.

SUMMARY OF THE INVENTION

An object of this invention is to provide a polysulfone hollow fiber membrane being excellent in filtration rate, pressure resistance and heat resistance.

Another object of this invention is to provide a polysulfone hollow fiber membrane having: a high filtration rate for body fluid, thereby having inulin effectively pass through; a sharp fractionation performance which for example prohibits $\beta_2$-microglobulin ($\beta_2$-MG) and pyrogen substances; and a high dialysis property for substances such as urea having low molecular weights.

Still another object of this invention is to provide a process for producing the above-mentioned polysulfone hollow fiber membrane.

Yet another object of this invention is to provide a treatment method for body fluid using the above-mentioned polysulfone hollow fiber membrane.

Yet another object of this invention is to provide an apparatus containing therein the above-mentioned polysulfone hollow fiber membrane.

The above objects can be achieved by a polysulfone hollow fiber membrane comprising on its inner surface a dense skin layer where no pores can be observed with a scanning electron microscope (SEM) of 10,000 magnifications, on its outer surface micropores having an average pore diameter of 500 to 5,000 Å at a fractional surface porosity of 5 to 50%, and a microporous structure inside the membrane, and having permeabilities for serum albumin and inulin of not more than 10% and at least 50% respectively and a water permeability rate of at least 60 ml/mmHg.m².Hr; a treatment method for body fluid utilizing the same and an apparatus containing therein the same for treating body fluid; as well as a process of making the same which comprises, extruding a dope of polysulfone, incorporating polyethylene glycol in an amount of not less than 80% by weight based on the weight of the polysulfone and which amount does not cause any phase separation even when the dope is heated up to 100° C., at a nozzle draft of at least 1.6 into a gaseous atmosphere temperature and moisture conditioned, to effect dry-jet-wet spinning.

DETAILED DESCRIPTION OF THE INVENTION

Figure 1:
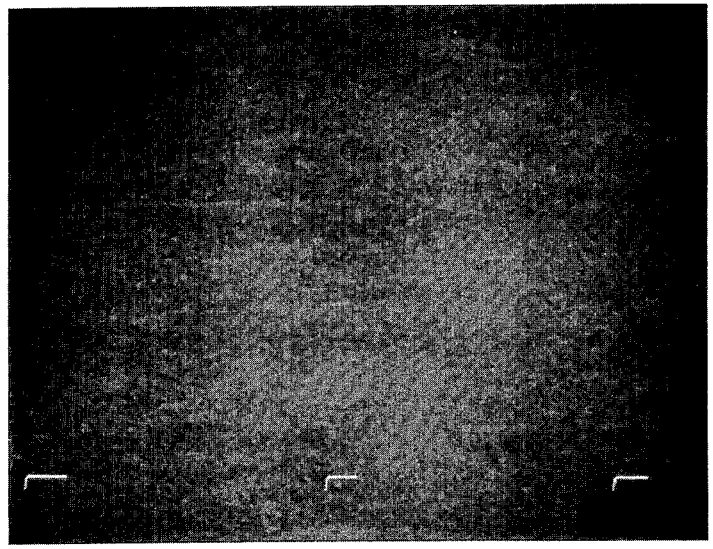
FIG. 1 is an electron microscopic photograph (magnification: 10,000) showing the inner surface of the polysulfone hollow fiber membrane of the present invention.
Figure 2:
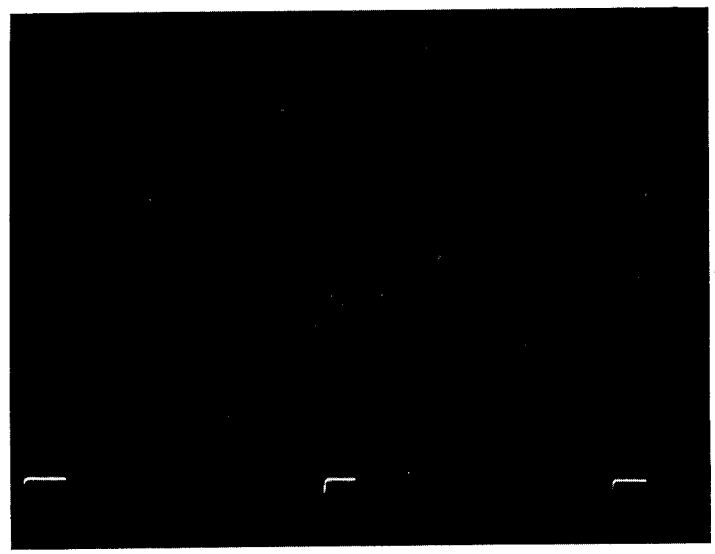
FIG. 2 is an electron microscopic photograph (magnification: 5,000) showing the outer surface of the polysulfone hollow fiber membrane of this invention.

The polysulfone hollow fiber membrane is excellent in filtration rate and also in pressure resistance and heat resistance as indicated by a compression factor of not more than 0.2.

In particular, the polysulfone hollow fiber membrane of this invention has, as apparent from the later described Examples, not only a high filtration rate for body fluid but also a sharp fractionation performance which has inulin effectively pass through and at the same time prohibits $\beta_2$-MG and pyrogen substances, as well as a high dialysability for substances such as urea having low molecular weights.

The hollow fiber membrane of this invention is a membrane of a sponge-like structure comprising on its inner surface a dense skin layer in which no pores can be observed even with an SEM of 10,000 magnification, on its outer surface micropores having an average pore diameter of 500 to 5,000 Å at a fractional surface porosity of 5 to 50%, and plenty of micropores inside the membrane. HEMOFLOW of Fresenius AG has, while being of sponge-like structure similar to that of this invention, an inner surface containing micropores which can be discerned clearly with an SEM of 10,000 magnification, and therefore is different from this invention. One of the reasons of the membrane of this invention being lower in time-dependent decrease of treatment speed for body fluid compared to the membrane of Fresenius AG is estimated to lie in the difference in the structure of inner surface.

The term "cannot be observed with an SEM of 10,000 magnification" herein means that there are no existing pores having pore diameters of not less than 100 Å.

It is necessary for the polysulfone hollow fiber membrane to have on the outer surface thereof micropores having an average pore diameter of 500 to 5,000 Å at a fractional surface porosity of 5 to 50%. This is necessary, since otherwise, that is, if the outer surface is also a dense skin layer on which no micropores are observable, the filtration rate will be low, and, when the polysulfone hollow fiber membrane is used for body fluid treatment, both removing performance for $\beta_2$-MG which is a target of removal by body fluid treatment and permeability for substances having so-called medium molecular weights of around several thousands to ten thousands will decrease too, and further diffusion permeability for substances such as urea having low molecular weights will markedly decrease. The term average pore diameter of micropores on the outer surface used herein is a value shown by the following equation:

$$D = \sqrt{\frac{(Di^2)^2 + \ldots + (Dn^2)^2}{Di^2 + \ldots + Dn^2}}$$

wherein:
D: average pore diameter
Di: diameter of an i-th micropore measured
Dn: diameter of an n-th micropore measured and
Di or Dn represents, when the micropore is nearly circular, a diameter of the circle and represents a diameter of a circle having the same area as that of the cross section of the pore when the pore is not circular. If the average pore diameter of the outer surface is less than 500 Å, the water permeability rate will become too small. If the average pore diameter exceeds 5,000 Å, not only the permeability for serum albumin will become too high, but also the pressure resistance will tend to be low, which are not preferred. Further in the case of external pressure filtration, too large pore size admits substances having superhigh molecular weights of more than 100,000 into the inside of the membrane, thereby causing a rapid decrease in the filtration rate, as well as an insufficient recovery of the membrane by back washing or even by washing with chemicals, which are not preferred either. The average pore diameter is more preferably in a range of from 1,500 to 3,500 Å. In the present invention, micropores of less than 100 Å diameter are not included in the calculation of the average pore diameter, though they may exist within an extent not to impair the object and effect of the invention. While micropores on the outer surface are preferably of a uniform pore diameter, it is not particularly required that they be of uniform, and they may be nonuniform. The fractional surface porosity as used herein means a ratio of total area of micropores opening on the outer surface to the area of the outer surface expressed in percentage. In the case where the fractional surface porosity is less than 5%, water permeability and permeabilities for substances of medium molecular weights will become low, which are not preferred. On the other hand if the fractional surface porosity exceeds 50%, surface strength will become low, thereby causing damage of the membrane when it is handled, which is not preferred either. A fractional surface porosity of 10 to 40% is more preferred from the viewpoint of a balance of permeability performance and mechanical property of the membrane.

In the present invention, the inside of the membrane is of microporous structure. The microporous structure as referred to herein is a sponge-like structure such as a network structure, a honeycomb structure and a microslit structure. Since the polysulfone hollow fiber structure of this invention is of a sponge-like structure having substantially no large cavities, it can give a stable permeability performance not depending on time, and it exhibits a high pressure resistance, particularly a high resistance against compression over a long period of usage, and further has a high strength.

One of the features of the polysulfone hollow fiber membrane of this invention is that it has a compression factor of not more than 0.2. The compression factor as used herein is expressed by the following equation:

$$\alpha = 1 - Kv_4/Kv_1$$

wherein:
$Kv_1$: A permeating rate $[m^3/(m^2 \cdot hr \cdot kg/cm^2)]$ when water of 100° C. is filtered by external pressure process at a filtration pressure of 1 kg/cm$^2$.

$Kv_4$: A permeating rate $[m^3/m^2 \cdot hr \cdot kg/cm^2)]$ of water of 100° C. when the water is filtered by external pressure process at a filtration pressure of 4 kg/cm$^2$.

The compression factor, of not more than 0.2, that is, in a range of from 0 to 0.2 means a high pressure resistance, particularly a high pressure resistance at a high temperature, and also a low decrease in the filtration rate with time. A membrane having an $\alpha$ of not less than 0.2 has, when performing a filtration treatment over a long period of time, a tendency of densing due to pressure increase accompanying the clogging of the membrane, thereby causing a rapid decrease in the filtration rate, which is not preferred.

The inside diameter of the polysulfone membrane of this invention is 50 to 500 $\mu$m, preferably 100 to 350 $\mu$m, more preferably 150 to 300$\mu$m; and the membrane thickness is 5 to 250 $\mu$m, preferably 10 to 100 $\mu$m, more preferably 20 to 70 $\mu$m. In the case where the inside diameter is 50 $\mu$m or less, the hollow fibers pack too close to each other, thereby rendering a liquid-tight module difficult to obtain; while the inside diameters of 500 $\mu$m or more will make the module too large for easy handling. In the case where the membrane thickness is 5 $\mu$m or less, the spinning thereof will be difficult and leaks may occur on the finished membrane; while the membrane thickness of 250 $\mu$m or more causes marked decreases in water permeability and diffusion permeability for substances having low molecular weights.

It is necessary that the polysulfone hollow fiber membrane of this invention have, besides the afore-mentioned structural characteristics, a permeability for serum albumin of not more than 10%, preferably not more than 5%, more preferably not more than 1.5%; a permeability for inulin of at least 50%, preferably at least 70%, more preferably at least 80%; a water permeability at 37° C. of not less than 60 ml/mmHg.m$^2$.Hr, preferably at least 200 ml/mmHg.m$^2$.Hr, more preferably at least 500 ml/mmHg.m$^2$.Hr, most preferably at least 1000 ml/mmHg.m$^2$.Hr.

Since serum albumin is an essential component of body fluid; if the permeability thereof is higher than 10%, there is required to supply fresh serum albumin for adjusting colloidal osmotic pressure of patient as the body fluid treatment proceeds, resulting in a high cost in the medical treatment, which is not preferred. If the permeability for inulin, which is a marker for substances having molecular weights of around 5,000, is 50% or below, there will be insufficiency in the effect of removing substances with socalled medium molecular weights, that is, molecular weights of around several thousands to ten thousands. Further, if the water permeability if 60 ml/mmHg.m$^2$.Hr or less, the passing speed of body fluid will be low, resulting in taking a very long time for the body fluid treatment, which is not preferred.

The polysulfone membrane of the present invention satisfying the above requirements completely prohibits lipopolysaccharides which are secretions of bacilli and said to be pyrogens, not to mention bacteria, bacilli and viruses.

Another feature of the membrane of the present invention is a specific permeation behavior against $\beta_2$-MG having accumulated in the blood of patient subjected to a long period of hemodialysis. That is, when dialysis or filtration with the membrane of this invention is carried out for the blood containing $\beta_2$-MG, the $\beta_2$-MG in the blood decreases with time although the concentration of $\beta_2$-MG in the permeated liquid (filtrate) keeps practically close to zero. The reason for this is not clear, but estimated to be that $\beta_2$-MG may be kept on the surface of or inside the membrane on account of the structure or the material of the membrane, or that there may be a specific affinity between polysulfone and $\beta_2$-MG. It is also one of the advantages of the present invention that by utilizing such specific behavior of $\beta_2$-MG, the $\beta_2$-MG can readily be removed without making the amount of filtration so large.

The permeability in this invention is measured according to the following method.

(1) Fix liquid-tight the both ends of bundles of a number of hollow fiber membranes, which number is determined to make the total inner surface area of the membranes 1 m$^2$ to a cylindrical housing, by a conventional method utilizing polyurethane resin. Then open the both ends to produce a module having an effective length of 24.5 cm in a form similar to an artificial kidney. While shaking the module, dip it in a 70% ethanol-water solution at room temperature for 60 minutes to effect full wetting of the polysulfone membranes and to substitute air in the membranes with the ethanol-water solution. After substituting the ethanol-water solution with physiological solution of sodium chloride, seal tight the module and store.

(2) The water permeability is determined by flowing by a blood pump, the physiological solution of sodium chloride kept at 37° C., through the inner path of of above-prepared hollow fiber membrane module (intracapillary perfusion). More concretely, the procedures below are followed:

Close the outlet of the module and admit the physiological solution of sodium chloride by dead end filtration under pressure to permeate, and to measure transmembrane pressures (TMP) under at least four different flow rates.

Plot the relationship between TMP's and the flow rates of filtrate on a graph to draw a linear line, and determine the permeability from the tangent of the line.

(3) Permeabilities for serum albumin, inulin and $\beta_2$-MG:

Prepare an bovine blood incorporating ACD, comprising 30% of hematocrit, 6.0±0.2 g/dl of total protein, 4±0.5 g/dl of serum albumin, 20±5 mg/l of $\beta_2$-MG and 20±5 mg/dl of inulin. Conduct intracapillary perfusion through a module substituted with physiological solution of sodium chloride, with a previously prepared bovine blood of 37° C. at a flow rate of 200 ml/min, and thereafter conduct circulation filtration for 30 minutes under TMP of 100 mmHg. Take blood samples at the inlet and the outlet of the module and a sample of filtrate, and determine the concentrations of the above-mentioned components to calculate the permeabilities from the following equation.

$$\text{Permeability (\%)} = \frac{100 \times 2 \times \text{filtrate concentration}}{\text{Inlet concentration} + \text{Outlet concentration}}$$

Analysis for the components are done by the following methods.

Serum albumin: BCG method
$\beta_2$-MG: GLAZYME EIA-TEST (WAKO PURE CHEMICALS INDUSTRIES, LTD.)
Inulin: 3-indolacetic acid method (4) The pyrogen permeability is determined, after the module, the circuit, etc. have all been made pyrogen-free by a conventional method, in the same manner as in the previous item (3) except that a 10 ng/ml solution of lipopolysaccharide is used instead of the bovine blood. The analysis of pyrogen is conducted according to WAKO Limulus Single Test (by WAKO PURE CHEMICALS INDUSTRIES, LTD.)

As described before, the polysulfone hollow fiber membrane of the present invention has excellent performances as a body fluid treating membrane, particularly as a hemodialysis and hemofiltration membrane for blood of long-term hemodialyzed patients, in which blood the accumulation of $\beta_2$-MG is notably high.

Next, the process of manufacturing method for the polysulfone hollow fiber membrane will be described.

Addition of a modifying agent to the dope for making a membrane has been employed to improve the permeability performance of the membrane, and various modifying agents according to the types of polymers and solvents have been reported. For example, as so-called swelling agents for increasing solvation effect of a dope, there are employed inorganic salts such as $ZnCl_2$ and organic substances such as alcohols, as well as polyethylene glycol (PEG).

PEG as a modifying agent has many advantages including:

good handling thanks to its water solubility and thus being readily removable by extraction after membrane formation, capability to control permeability performance by selecting a suitable type from among various types having different molecular weights, capability to be added in a relatively large amount because of its high solubility in solvents for polysulfone, in spite of its high molecular weight, property to increase dope viscosity because of its high molecular weight, and others.

Among the above, increasing the addition to a dope is effective since permeability performance, particularly water permeability, can thereby increase. Concerning the viscosity of dope, while generally the water permeability increases as the polymer concentration decreases, which fact is preferred, the decrease in the polymer concentration will cause the dope viscosity to decrease, thereby worsening the membrane formation stability. For example in the case of hollow fibers, their dope spinning is difficult unless the dope viscosity is above a certain level. The viscosity increasing effect by PEG addition is therefore advantageous.

Methods for manufacturing a polysulfone membrane by using PEG are disclosed in Unexamined Japanese Patent LaidOpen Nos. 89475/1975 and 26283/1979. Both of the methods however are of batch-type and for manufacturing flat membranes, with the obtained membrane being a microfiltration membrane (for removing fine particular matters) having micropores of about 0.03 to 10 $\mu m$ diameter on the surface thereof. Accordingly, there is not disclosed a membrane having a microporous (sponge) structure as aimed by the present invention, which has markedly specified permeabilities as a body fluid treating membrane, comprising on its inner surface a dense skin layer and on its outer surface micropores having an average pore diameter of 500 to 5,000 Å at a fractional surface porosity of 5 to 50%.

Unexamined Japanese Patent Laid-Open No. 114702/1983 discloses a process for manufacturing a hollow fiber membrane, which comprises utilizing a spinning dope of polysulfone having incorporated PEG in an amount which just causes phase separation. The membrane obtained by this method cannot be used as a body fluid treating membrane as aimed by the present invention, due to its too high permeability for serum albumin.

The present inventors have carried out a number of spinning experiments and as a result found that for the purpose of obtaining the afore-mentioned polysulfone hollow fiber membrane having a structure and permeability performance suited for treating body fluid, it is important, in a process of preparing a dope of a polysulfone and polyethylene glycol dissolved in a solvent containing at least one compounds selected from the group consisting of N-methylpyrrolydone, dimethylacetamide and dimethyl sulfoxide, which are good common solvents for the two, followed by extruding the dope from an annular orifice into hollow fibers; to extrude a dope of a polysulfone having incorporated a polyethylene glycol (PEG) in an amount of not less than 80% against the polysulfone and which amount does not cause any phase separation even when the dope is heated up to 100° C., at a nozzle draft of at least 1.6 into a temperature and moisture conditioned gaseous atmosphere, to effect dry-jet-wet spinning. Hereinbelow the process of this invention is explained in more details.

In the process for manufacturing the polysulfone hollow fiber membrane, the polysulfone concentration in a spinning dope is 12 to 30% by weight, preferably 15 to 22% by weight. In the case where the concentration is less than 12% by weight, the strength of the obtained membrane is insufficient; while in the case where the concentration exceeds 30% by weight, a membrane having a sufficient permeability performance cannot be obtained because of the high polymer concentration and because the amount of PEG added can not be increased, which is not preferred.

Common solvents for polysulfone and PEG are those being capable of dissolving both polysulfone and PEG and having a compatibility with coagulating solutions capable of coagulating polysulfone. Examples of them include polar organic solvents such as dimethyl sulfoxide, dimethylacetamide and N-methylpryyolydone, among which dimethylacetamide and N-methylyrrolidone are most preferred from the viewpoint of affinity with polysulfone.

The amount of PEG added according to this invention is not less than 80% by weight on the basis of the weight of polysulfone and one which does not cause phase separation even when the dope is heated up to 100° C., and generally preferably 120 to 250% by weight, more preferably 160 to 200% by weight.

The amount which causes phase separation used in this specification means an amount of PEG added, when PEG is gradually added to a mixed solution having a temperature of 100° C. of a polysulfone and a solvent, at which the polysulfone and/or the PEG undergo phase separation, resulting in a formation of white turbid slurry. If the addition of PEG is less than 80% by weight, a sufficient water permeability cannot be acquired; while an addition more than that leading to phase separation will make unstable the spinning operation, thereby rendering albumin permeability of the obtained membrane too high, which is not preferred for a body fluid treating membrane.

In the present invention there are employed PEG's having molecular weights of 400 to 20,000, preferably 600 to 2,000. A PEG having a molecular weight of less than 400 will hardly yield an improvement effect on the permeability performance of membrane, while one having a molecular weight exceeding 20,000 cannot be added in a large amount, thereby giving only insufficient permeability performance.

In preparing a dope, generally a mixture of a polysulfone with a PEG and a common solvent thereof is heated while stirring at a temperature of 80° to 130° C., preferably 100° to 130° C. taking into consideration dissolution rate of the polysulfone and the PEG in the common solvent, to give a uniform solution, followed by cooling to 0° to 60° C., preferably 10° to 40° C. to obtain a dope for spinning.

If the thus prepared dope is spun by a wet process, the obtained fiber will tend to have an outer surface of a dense skin layer. For the purpose of obtaining an outer surface structure having micropores thereon with an average pore diameter of 500 to 5,000 Å at a fractional surface porosity of 5 to 50%, a dry-jet-wet spinning is most preferable.

The dry-jet-wet spinning as used herein means a process which comprises extruding a dope first into a gaseous atmosphere (in most cases, air) and thereafter introducing the extruded fiber into a coagulating solution, that is, a process which utilizes a nozzle not dipped in the coagulating solution. If the distance between the nozzle and the coagulating solution, that is, a pass run in a gas, is defined as a dry zone length, the dry zone length is preferably between 0.1 to 200 cm. If the dry zone length is shorter than 0.1 cm, even a small ripple of the coagulating solution will wet the nozzle, thereby rendering the dry-jet-wet spinning practically impossible to conduct. On the other hand if it exceeds 200 cm, fiber swingings will be too large to conduct a stable spinning. The dry zone length is more preferably 0.5 to 50 cm, and most preferably 1 to 30 cm from the viewpoint of balancing spinnability and membrane characteristics. There have been employed dry-jet-wet spinning processes in order to make fine the obtained hollow fiber membrane or to increase spinning speed, and in order to evaporate the solvent used in the dry zone to form a skin layer on the surface. In the present invention, however, the spinning system is employed not for forming a skin layer on the outer surface, but, conversely, for forming micropores and leading to a low coagulation owing to a very small amount of moisture present in the dry zone. Accordingly, it is clearly different from objects and effects and functions of conventional dry-jet-wet spinning systems.

The effect of the dry-jet-wet spinning of this invention is characteristic in that it produces, even when the dry zone length is as small as 0.1 cm, a definite difference from a wet spinning process in which the dry zone length is 0 cm. By adjusting the dry zone length and the atmosphere around the dry zone, the pore size of the micropores on the outer surface of the obtained fiber can be controlled. The warming and humidifying of the dry zone is an important factor affecting formation of micropores having an average pore diameter of 500 to 5,000 Å on the outer surface, and their conditions are preferably not less than 30° C.×70% RH, more preferably not less than 40° C.×90% RH and can give a membrane having a large fractional surface porosity.

A nozzle draft between the dope outlet and the first roller, that is, a value of "rotation speed of the first roller/linear velocity of dope extruded" is also a factor greatly influencing the membrane structure and permeability performance of the obtained membrane. It is important for obtaining the membrane of this invention that the nozzle draft be at least 1.6, preferably at least 2.4, most preferably at least 2.8. If the nozzle draft is less than 1.6, the obtained membrane structure will tend to be too dense, thereby decreasing the permeability for inulin.

Concerning the coagulating bath, there are no specific limitations insofar as it is miscible with a common solvent for polysulfone and PEG, and is at the same time a nonsolvent for polysulfone. Generally, water or a mixture of an organic solvent (preferably dimethylacetamide or N-methylpyrrolidone) with water is used. Further, an addition thereto a surfactant or the like may sometimes produce a favorable effect. The inside coagulating liquid to be flowed through the needle of an annular orifice is subject to no specific limitations, and there can be used liquids having a coagulation ability, incompatible liquids, gases (air and nitrogen), and the like, among which preferred are liquids having a coagulation ability such as water or a water-solvent system. More particularly preferred is a mixture of an organic solvent with water, a coagulating liquid, in a mixing ratio of the organic solvent to water by weight of 0/100 to 85/15. The solvent/water ratio of 0/100 to 70/30 is the most suitable for a well-balanced spinnability and membrane performance.

After the coagulation, the fiber is washed for removing the solvent and PEG at a temperature of at least 60° C., preferably at least 90° C.

A wet heat treatment in a bath containing water as a principal component may further be carried out as required for removing PEG and improving pressure resistance. While generally drying a wet membrane will decrease its water permeability, the wet heat treatment can maintain the water permeability still after drying, and thus is effective.

The polysulfone hollow fiber membranes are bundled and the both ends of the bundle are fixed with a polyurethane resin or the like to a housing, to give a module. The thus obtained module is as required subjected to a sterilization treatment by a known method such as EOG sterilization, γ-ray sterilization, autoclave sterilization or the like, and thereafter offered, as a body fluid treating apparatus, for filtration, condensation, etc. In using such a body fluid treating apparatus, the arterial pressure may be employed as a driving force for treating blood, or if necessary a pump may be employed for treating a body fluid.

The use of the polysulfone hollow fiber membrane for treating body fluid can, when for example condensing various components in ascites, sharply shorten the condensation time as compared with the case of using a cellulose hollow fiber, which is a conventional method. When condensing various components in a diluted blood, it is possible to treat, without losing blood plasma proteins, in a treating time equivalent to that by a centrifugal separation, which is a conventional method.

Hereinbelow the present invention will be explained referring to Examples, but they are by no means limitations of the invention.

EXAMPLE 1

A uniform transparent dope was prepared by mixing 20 parts by weight of a polysulfone (UDEL P1700, available from Union Carbide Corp.) with 36 parts by weight of a polyethylene glycol (PEG #600, molecular weight: 600, available from Sanyo Chemical Industries) and 44 parts by weight of dimethyl-acetamide (DMA), and thereafter stirring the mixture while heating. The viscosity of the thus obtained dope was 121 poise at 25° C. After being allowed to stand still at 25° C. for 16 hours to effect deaeration, the dope was extruded through an annular orifice having outer and inner diameters of 0.70 mm and 0.28 mm respectively, while as an inside coagulating liquid an aqueous solution of DMA in a concentration of 55% by weight was being introduced at a rate of 1.00 cc/min into the atmosphere conditioned to a relative humidity of 95% and a temperature of 40° C., at a rate of 0.88 cc/min. After running a path of 10 cm in air, the extruded dope is introduced into water at 30° C. and coagulated into a hollow fiber, followed by winding up at a speed of 10.5 m/min. The then nozzle draft was 2.9. The hollow fiber was rewound onto a frame, washed under a constant length in water at 95° C. for removing residual solvent and PEG to give a hollow fiber having outer and inner diameters of 380 μm and 240 μm respectively. The compression factor of the thus obtained hollow fiber was determined according to the afore-described method to give a value of 0.14, which was good.

Observation with an SEM of the hollow fiber found on its inner surface a dense skin layer having no pores visible even with a magnification of 10,000, on its outer surface micropores having an average pore diameter of 2,000 Å at a fractional surface porosity of 20% and a sponge-like structure inside the membrane.

Evaluations were made according to the afore-mentioned methods on membrane performances of the thus obtained hollow fiber membrane to give a water permeability of 1,100 ml/mmHg.m².hr, and permeabilities for albumin, inulin and $\beta_2$-MG of 0%, 95% and 0% respectively. The concentration of $\beta_2$-MG at the inlet of the module after 30 minutes' treatment was reduced to about 60% against the initial concentration. Permeation of pyrogen was not observed.

EXAMPLE 2

A hollow fiber was obtained in the same manner as in Example 1 except for changing the solvent to N-methylpyrrolidone and employing a 50 wt% aqueous solution of NMP as the inside coagulating liquid. The obtained hollow fiber had on its outer surface micropores with an average pore diameter of 1,000 Å at a fractional surface porosity of 15% and outer and inner diameters of 380 μm and 240 μm respectively. The compression factor of the hollow fiber was 0.10, and the membrane performances of the hollow fiber were the same as those in Example 1 except for water permeability being 560 ml/mmHg.m².hr and inulin permeability being 62%.

COOPERATIVE EXAMPLE 1

A hollow fiber having a similar appearance as that of the hollow fiber obtained in Example 1 and outer and inner diameters of 385 μm and 240 μm respectively was obtained by spinning in the same manner as in Example 1 except that the extrusion rate was 1.20 cc/min and the nozzle draft was 1.3.

The thus obtained hollow fiber showed a compression factor of 1.12, a water permeability of 656 ml/mmHg.m².hr, and permeabilities for albumin and $\beta_2$-MG of both 0%. While permeation of pyrogen was not observed, permeability for inulin was as low as 48%. Further, due to the low nozzle draft, tension of the hollow fiber in the coagulating bath was reduced, resulting in a frequent getting off from the take-up roller, thereby rendering unstable the spinning.

EXAMPLE 3

A hollow fiber having outer and inner diameters of 380 μm and 250 μm respectively was obtained by spinning in the same conditions as in Example 1 except that the dope was extruded through an annular orifice having outer and inner diameters of 0.65 mm and 0.28 mm respectively at a rate of 0.94 cc/min and that the nozzle draft was 2.0.

The compression factor of the thus obtained hollow fiber was 0.15 and the water permeability was 600 ml/mmHg.m².hr. The permeabilities for albumin, inulin and $\beta_2$-MG were 0%, 80% and 0% respectively. The reduction of $\beta_2$-MG concentration at the module inlet showed a similar tendency to that in Example 1. Permeation of pyrogens was not observed.

EXAMPLE 4

A module (effective membrane area: 1.3 m$^2$) was prepared by bundling 6,500 pieces of the hollow fiber membranes of this invention and fixing with a polyurethane resin the both ends to a cylindrical housing. Ascites taken from a patient of liver cirrhosis was circulated through a circuit incorporating the thus obtained module, to effect condensation of various components. The flow rate of the filtrate was controlled with a cramp fitted on the circuit at the module outlet, such that the pressure at the module inlet would be 200 mmHg under a constant flow rate of the ascites introduced of 200 ml/min. The then changes in amounts of liquid and concentrations were as shown in TAble 1.

TABLE 1

| | Time min | | | | |
|---|---|---|---|---|---|
| | 0 | 27 | | 39 | |
| | Original ascites | Condensed liquid | Filtrate | Condensed liquid | Filtrate |
| | Volume of liquid ml | | | | |
| | 4000 | 1800 | 2200 | 1200 | 2800 |
| Concentration | | | | | |
| Total protein g/dl | 3.0 | 6.0 | 0 | 9.0 | 0 |
| Albumin g/dl | 2.0 | 4.0 | 0 | 6.0 | 0 |
| BUN mg/dl | 16 | 16 | 16 | 16 | 16 |
| Na mEq/l | 130 | 130 | 130 | 130 | 130 |
| K mEq/l | 3.5 | 3.5 | 3.5 | 3.5 | 3.5 |
| Condensing ratio of total protein | — | 2 | — | 3 | — |
| Recoveray ratio of total protein | — | 90 | — | 90 | — |

Accordingly, by employing the hollow fiber membrane of the present invention the time required for condensation could be shortened to about half that by a conventional method of using a cellulose hollow fiber membrane. While loss of proteins caused by the depositing of proteins to inner surface of the hollow fiber was almost negligible and alubumin and the like were condensation-recovered at a high ratio, components having low molecular weights were filtered and discharged at the same concentration, thereby causing uremic toxins not to condense and keeping constant a balance of electrolytes, which facts proved that a markedly physiological protein condensation was possible.

EXAMPLE 5

A module (effective membrane area: 1.3 m$^2$) was prepared by bundling 6,500 pieces of the hollow fiber membranes of this invention and fixing with a polyurethane resin the both ends to a cylindrical housing. A diluted blood remaining in a circuit of a cardiopulmonary bypass used at an open heart surgery was circulated through a circuit incorporating the thus obtained module, to undergo condensation of various blood components. The filtration pressure was controlled to be 200 mmHg with a cramp fitted on the circuit at the module outlet under a constant flow rate of the blood circulated of 200 ml/min. The filtration pressure was calculated from the following equation:

$$\text{Filtration pressure} = \frac{\text{Inlet pressure} + \text{outlet pressure}}{2} - \text{pressure at filtrate side}$$

The changes in the liquid amounts and concentrations were as shown in TABLE 2.

TABLE 2

| | Time min | | |
|---|---|---|---|
| | 0 | 10 | |
| | Original blood | Condensed blood | Filtrate |
| | Volume of liquid ml | | |
| | 2000 | 1000 | 1000 |
| Hematocrit % | 20 | 41 | 0 |
| Concentration | | | |
| Total protein g/dl | 3.0 | 7.8 | 0 |
| Hemoglobin mg/dl | 50 | 115 | 0 |
| Na mEq/l | 60 | 60 | 60 |
| K mEq/l | 1.5 | 1.5 | 1.5 |

Accordingly, by using the hollow fiber membrane of the present invention, the time required for the treatment could be the same as that in the case of using a conventional method of employing a centrifugal separator. Further, various blood plasma components, particularly protein, which had been discarded, could be effectively recovered. Since components having low molecular weights are filtered and discharged at the same concentrations, the balance of electrolytes is kept constant, thereby making possible a markedly physiological protein condensation.

EXAMPLE 6

Modules having effective filtration areas of 1.3 m$^2$ and 0.4 m$^2$ were prepared and subjected to a filtration test using bovine blood to give the following results:

TEST RESULTS OF BOVINE BLOOD FILTRATION THROUGH MODULES

| Pressure difference between membranes [mmHg] | 1.3 m$^2$ module | | 0.4 m$^2$ module | |
|---|---|---|---|---|
| | Flow rate filtered [ml/min] | Permeability for inulin [—] | Flow rate filtered [ml/min] | Permeability for inulin [—] |
| 50 | 30 | 0.95 | 15 | 0.94 |
| 100 | 55 | 0.95 | 28 | 0.93 |
| 150 | 65 | 0.92 | 35 | 0.90 |
| 200 | 70 | 0.90 | 38 | 0.89 |
| 250 | 75 | 0.89 | 40 | 0.87 |
| 300 | 75 | 0.84 | 40 | 0.82 |

Bovine blood: hematocrit 38%,
Total protein concentration: 6 g/dl
Flow rate of blood: 200 ml/min The UFR of the bovine blood was found to be 14 to 45 ml/m$^2$.hr.mmHg. A permeability for inulin of 0.82 to 0.95 was observed. At the same time, permeabilities for B$_2$-MG and albumin were determined to give results of 0 at all points.

The 1.3 m$^2$ module was clinically used for treating a patient with chronic renal failure. Blood filtration comprising 20-liter filtration and 18-liter supplement was executed on the patient having a high $\beta_2$-MG concentration in blood. While the concentration of $\beta_2$-MG before the treatment had been 69 mg/l, that after the treatment reduced to 36 mg/l, and that in the filtrate was below the detection limit.

Other cases are shown in the following table.

VALUES OF $\beta_2$-MG BEFORE AND AFTER TREATMENT OF BLOOD FILTRATION

|  | Case 1 | Case 2 | Case 3 | Case 4 | Case 5 |
| --- | --- | --- | --- | --- | --- |
| Volume supplied [1] | 15 | 16 | 16 | 18 | 18 |
| Volume filtered [1] | 19.0 | 18.8 | 19.5 | 21.9 | 21.7 |
| Before treatment [mg/l] | 67.0 | 45.0 | 34.0 | 39.0 | 45.0 |
| After treatment [mg/l] | 25.0 | 16.4 | 19.0 | 14.0 | 14.0 |

Flow rate of blood: 200 ml/min
Filtration pressure: 200 to 250 mmHg
Time treated: 4.5 to 5.5 hours As shown above it was found that the module can, though the permeability for $\beta_2$-MG is 0 as shown in the results of filtration test for bovine blood, remove $\beta_2$-MG from human blood by conducting blood filtration treatment.

EXAMPLE 7

The 0.4 m² module prepared in Example 6 was clinically used for CAVH (Continuous Arterio Venous Hemofiltration) for patients suffering from renal failure, cardiac insufficiency and other diseases. Since CAVH is a system carrying out blood filtration by employing arterial pressure as a driving force to obtain blood flow, the feature of the module having a high UFR even at a low pressure could be fully exerted. The results of treatments were summarized in the following table.

CAVH TREATMENTS

| Case | Disease and complication | Time treated | Total Volume filtered |
| --- | --- | --- | --- |
| 1 | Cardiac insufficiency | 43 hours | 1600 ml |
| 2 | Chronic renal failure | 25 | 2300 |
| 3 | Cardiac insufficiency, nephrotic syndrome | 23 | 4000 |
| 4 | Accute myocardial infarction, cardiac insufficiency | 51 | 15000 |
| 5 | Accute myocardial infarction, cardiac insufficiency | 18 | 5600 |
| 6 | Cardiac insufficiency, valvulitis | 160 | 14000 |
| 7 | Incurable nephrosis | 60 | 14000 |
| 8 | Nephrotic syndrome | 24 | 5300 |
| 9 | Cardiac insufficiency, sepsis | 42 | 8000 |
| 10 | Cardiac insufficiency, nephrotic syndrome | 20 | 1300 |

In all of the ten cases, the module exhibited stable filtration performances without forming any visible thrombi.

EXAMPLE 8

The 1.3 m² module prepared in Example 6 was used for hemodialysis. For 9 cases, clearances and removal ratios for various solutes are shown in the table below.

CLEARANCE AND REMOVAL RATIO OF EACH SOLUTE AT BLOOD DIALYSIS THROUGH 1.3 M² MODULE

| Case | Urea nitrogen $C_L$ | Removal ratio | Creatine $C_L$ | Removal ratio | Uric acid $C_L$ | Removal ratio | Inorgnic phosphor $C_L$ | Removal ratio | $\beta_2$-MG Removal ratio |
| --- | --- | --- | --- | --- | --- | --- | --- | --- | --- |
| 1 | 152 | 63 | 135 | 61 | 124 | 70 | 133 | 61 | 31 |
| 2 | 165 | 68 | 142 | 63 | 127 | 74 | 147 | 66 | 52 |
| 3 | 157 | 62 | 131 | 67 | 124 | 85 | 135 | 46 | 33 |
| 4 | 164 | 67 | 150 | 63 | 139 | 68 | 154 | 53 | 38 |
| 5 | 163 | 63 | 145 | 58 | 132 | 63 | 150 | 43 | 28 |
| 6 | 165 | 62 | 142 | 55 | 135 | 65 | 137 | 32 | 22 |
| 7 | 144 | 55 | 132 | 51 | 116 | 57 | 127 | 43 | 2 |
| 8 | 163 | 62 | 145 | 54 | 132 | 67 | 149 | 52 | 40 |
| 9 | 148 | 61 | 142 | 57 | 125 | 66 | 142 | 40 | 34 |

$C_L$: clearance (ml/min)
Removal ratio: (value before dialysis - value after dialysis/value before dialysis) × 100 (%)

The 1.3 m² module was excellent in dialysis performance for substances having low molecular weights, thereby proving to have enough ability as a hemodialyzer. The module was found to be capable of removing $\beta_2$-MG at the same time.

EXAMPLE 9 AND COMPARATIVE EXAMPLES 2 THROUGH 5

The hollow fiber membrane of the present invention was evaluated for permeability performances for $\beta_2$-MG and albumin.

A module having an effective membrane area of 100 cm² was prepared by bundling 100 pieces of the hollow fiber membranes of this invention, and thereafter fixing the both ends to a cylindrical housing with an epoxy resin.

Separately, drain discharged after peritoneal dialysis containing $\beta_2$-MG was condensed and a blood plasma obtained by mixing the condensate with bovine blood plasma having a total protein concentration of 7 g/dl and an albumin concentration of 3 g/dl and B₂-MG concentration of 20 mg/l was submitted to experiments.

Figure 3:
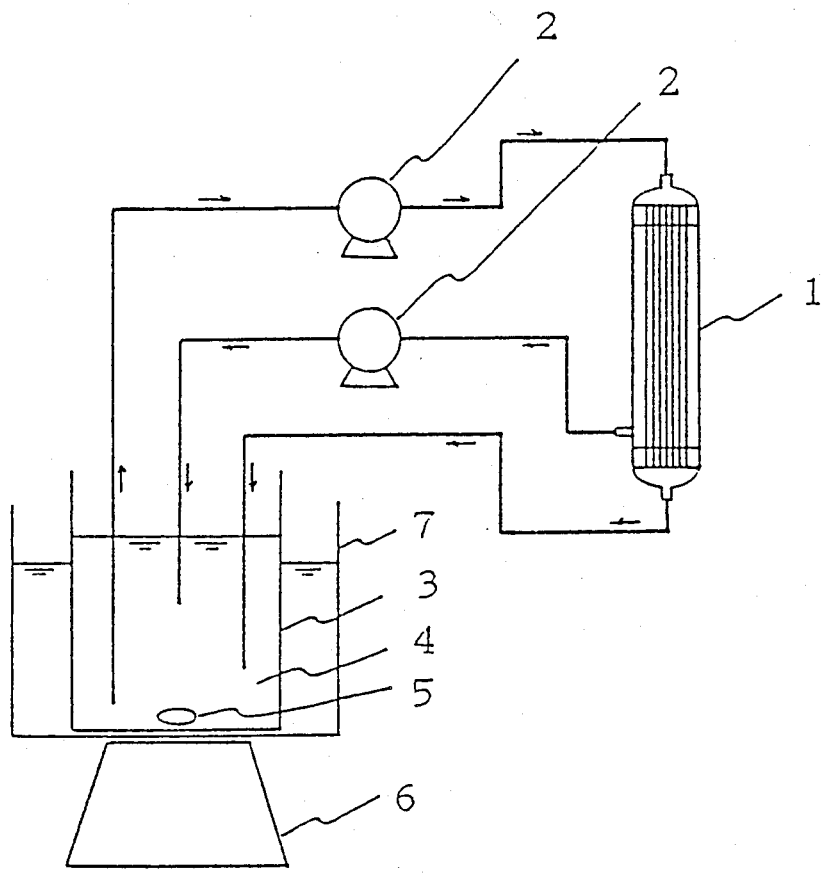
FIG. 3 is a rough drawing of an apparatus used for filtration experiments in Example 9 and Comparative Examples 2 through 5.

A circulation filtration was conducted through an apparatus shown in FIG. 3, under conditions of a circulation flow rate ($Q_B$) of 4 ml/min and a filtration flow rate ($Q_F$) of 0.4 ml/min. A sample of blood plasma in the beaker and several samples of filtered blood plasma after starting the filtration were taken, and analyzed for blood plasma components. (Example 9)

For comparison purpose, four modules each having an effective membrane area of 100 cm² were prepared with a polysulfone membrane made by Fresenius AG [HEMOFLOW (F-80)] and 3 test polysulfone membranes as shown below, A, B and C, and they were submitted for filtration experiments in the same manner as in Example 9. (Comparative Examples 2 through 5).
Polysulfone membrane A: a uniform porous membrane having micropores with an average pore diameter of 0.2 μm and a permeability for albumin of 100%.

Polysulfone membrane B: an asymmetric membrane comprising a dense skin layer having microslits of an average slit width of 0.02 μm and a sponge-like structure supporting layer having pores of 0.5 to 3 μm, and having permeabilities for albumin and inulin of 95% and 100%, respectively.

Polysulfone membrane C: an asymmetric membrane comprising a dense skin layer being unobservable even with an SEM of 10,000 and a supporting layer having voids of finger-like structure having diameters of 5 to 10 μm, and having permeabilities for albumin and inulin of 0% and 30%, respectively.

Figure 4:
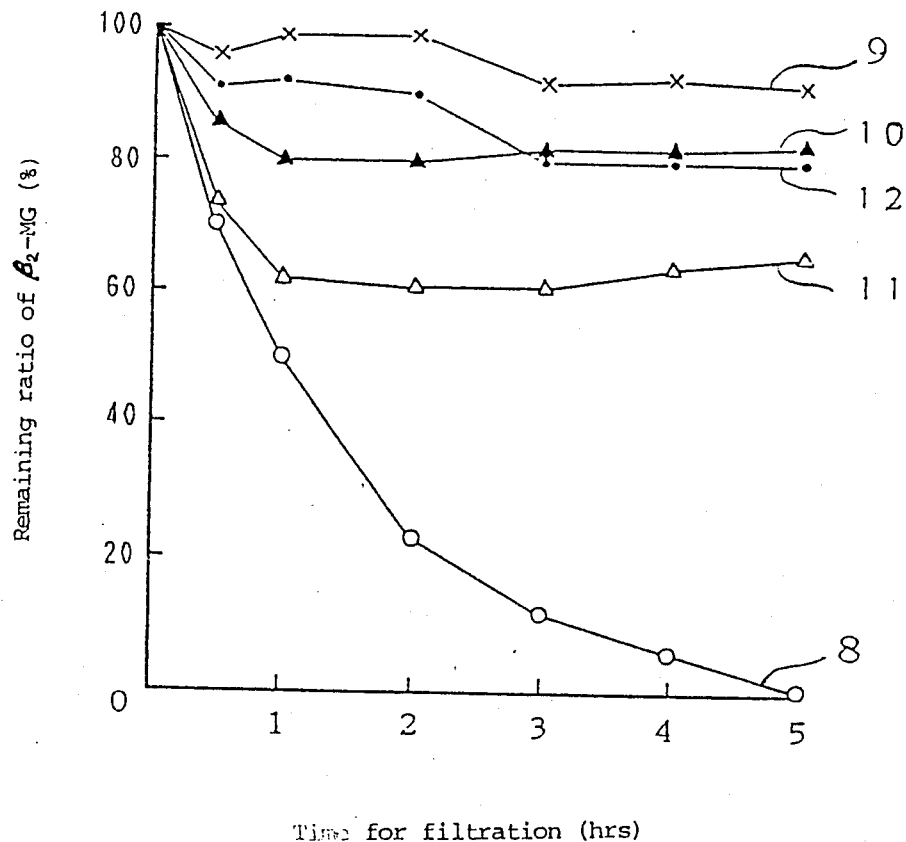
FIG. 4 is a graph showing changes of remaining ratio of $\beta_2$-MG in blood plasma obtained in the filtration experiments in Example 9 and Comparative Examples 2 through 5.
1: Module,
2: Roler pump,
3: Beaker,
4: Serum
5: Magnet,
6: Stirrer
7: Constant temperature water tank Refer to FIG. 3.
8: Polysulfone membrane in Example 9
9: Polysulfone membrane in Comparative Example 2
10: Polysulfone membrane in Comparative Example 3
11: Polysulfone membrane in Comparative Example 4
12: Polysulfone membrane in Comparative Example 5
Refer to FIG. 4.

FIG. 4 shows a time dependent change in the remaining ratios of $\beta_2$-MG in blood plasma in the beaker. While the polysulfone membrane of Fresenius AG and the three other test polysulfone membranes showed slight decreases in the remaining ratios of $\beta_2$-MG one hour after the start of the filtration and thereafter nearly constant concentration, the membrane of the present invention reduced the remaining ratio of $\beta_2$-MG with time finally after five hours to a concentration of $\beta_2$-MG in blood plasma in the beaker of nearly 0.

SC's for albumin and $\beta_2$-MG, water permeabilities and $\beta_2$-MG remaining ratios were as shown in TABLE 3.

TABLE 3

|  | SC[1] | | Water permeability [ml/mmHg · m² · Hr] | $\beta_2$-MG remaining ratio[2] [%] |
| --- | --- | --- | --- | --- |
|  | Albumin | $\beta_2$-MG | | |
| Example 9 | 0.0 | 0.0 | 900 | 12 |
| Comparable Example 2 | 0.01 | 0.60 | 180 | 92 |
| Comparable Example 3 | 1.00 | 1.00 | 6000 | 81 |
| Comparable Example 4 | 0.95 | 1.00 | 1800 | 60 |
| Comparable Example 5 | 0.0 | 0.0 | 700 | 80 |

[1](Concentration of filtrate one hour after the start of filtration)/concentration in the beaker
[2](Concentration in the beaker 3 hours after the start of filtration/concentration before filtration) × 100

Above results clearly show the effect of the hollow fiber membrane of the present invention.

What is claimed is:

1. A hollow fiber membrane comprising a polysulfone hollow fiber having on its inner surface a dense skin layer having no pores observable even with a scanning electron microscope (SEM) of magnification of 10,000, on its outer surface micropores having an average pore diameter of 500 to 5000 Å at a fractional surface porosity of 5 to 50%, and a microporous structure inside said membrane, said membrane exhibiting properties which render it suitable for filtering body fluids and having permeabilities of serum albumin and inulin of not more than 10% and not less than 50% respectively, and a water permeability of not less than 60 ml/mm Hg.m².Hr.

2. A polysulfone hollow fiber membrane as defined in claim 1, having permeability for $\beta_2$-microglobulin of 0.

3. A polysulfone hollow fiber membrane as defined in claim 1, wherein said average pore diameter of said micropores on its outer surface is 1,000 to 3,500 Å.

4. A polysulfone hollow fiber membrane as defined in claim 1, wherein the fractional surface porosity of said micropores on its outer surface porosity of said micropores on its outer surface is 10 to 40%.

5. A polysulfone hollow fiber membrane as defined in claim 1, wherein said water permeability is at least 200 ml/mmHg.m².Hr.

6. A polysulfone hollow fiber membrane as defined in claim 1, having a permeability for pyrogen of 0.

7. A polysulfone hollow fiber membrane as defined in claim 1, having a compression factor of not more than 0.2.

8. A process for manufacturing a polysulfone hollow fiber membrane, which comprises extruding a dope prepared by dissolving a polysulfone and a polyethylene glycol in a solvent selected from the group consisting of N-methylpyrrolidone, dimethylacetamide and dimethyl sulfoxide, which are common solvents for polysulfone and polyethylene glycol, through an annular orifice into a hollow fiber; said process further comprising extruding said dope having incorporated said polyethylene glycol in an amount of at least 80% by weight based on the weight of said polysulfone sufficient to preclude phase separation even when said dope is heated to 100° C., at a nozzle draft of at least 1.6 into a gaseous atmosphere temperature and moisture conditioned for dry-jet-wet spinning, effecting dry-jet-wet spinning and thus forming a polysulfone hollow fiber membrane exhibiting properties which render it suitable for filtering body fluids.

9. A process for manufacturing a polysulfone membrane as defined in claim 8, wherein the concentration of said polysulfone in said spinning dope is 12 to 30% by weight.

10. A process for manufacturing a polysulfone membrane as defined in claim 8, wherein said incorporation amount of said polyethylene glycol is 120 to 250% by weight based on the weight of said polysulfone.

11. A process for manufacturing a polysulfone membrane as defined in claim 8, wherein said incorporation amount of said polyethylene glycol is 160 to 200% by weight based on the weight of said polysulfone.

12. A process for manufacturing a polysulfone membrane as defined in claim 8, wherein said common solvent is dimethylacetamide.

13. A process for manufacturing a polysulfone membrane as defined in claim 8, wherein said common solvent is N-methylpyrrolidone.

14. A process for manufacturing a polysulfone membrane as defined in claim 8, wherein a dry zone length in said dry-jet-wet spinning is 0.1 to 200 cm.

15. A process for manufacturing a polysulfone membrane as defined in claim 8, wherein a dry zone length in said dry-jet-wet spinning is 0.5 to 30 cm.

16. A process for manufacturing a polysulfone membrane as defined in claim 8, wherein there is employed an inside coagulating solution of either water or a mixture of a common solvent for polysulfone and polyethylenevglycol with water.

17. A process for manufacturing a polysulfone membrane as defined in claim 8, wherein there is employed an inside coagulating solution of a mixture of a common solvent for polysulfone and polyethyleneglycol with water in a mixing ratio of solvent/water of 0/100 to 85/15.

18. A process for manufacturing a polysulfone membrane as defined in claim 8, wherein there is employed an outside coagulating solution of water.

19. A method comprising: treating body fluid, by contacting said fluid with a polysulfone hollow fiber membrane comprising on its inner surface of a dense skin layer having no pores observable even with an scanning electron microscope (SEM) of magnification 10,000, on its outer surface micropores having an average pore diameter of 500 to 5,000 Å at a fractional surface porosity of 5 to 50%, and a microporous structure inside said membrane, and having permeabilities for serum albumin, inulin and $\beta_2$-microglobulin of not more than 10%, not less than 50% and 0 respectively, and a water permeability of not less than 60 ml/mmHg.m$^2$.Hr.

20. An apparatus comprising: means for treating body fluid prepared by bundling a plurality of polysulfone hollow fiber membranes each comprising on its inner surface of a dense skin layer having no pores observable even with an scanning electron microscope (SEM) of magnification 10,000, on its outer surface micropores having an average pore diameter of 500 to 5,000 Å at a fractional surface porosity of 5 to 50%, and a microporous structure inside said membrane, and having permeabilities abilities for serum albumin, inulin and $\beta_2$-microglobulin of not more than 10%, not less than 50% and 0 respectively, and a water permeability of not less than 60 ml/mmHg.m$^2$.Hr, placing the bundle in a housing fitted with openings for introducing and discharging body fluid therethrough and fixing with a thermosetting resin the both ends of the bundles, while keeping the both ends open, to said housing.

* * * * *